(12) United States Patent
Park et al.

(10) Patent No.: US 7,980,272 B2
(45) Date of Patent: Jul. 19, 2011

(54) MICROFLUIDIC VALVE, METHOD OF MANUFACTURING THE SAME, AND MICROFLUIDIC DEVICE COMPRISING THE MICROFLUIDIC VALVE

(75) Inventors: Jong-myeon Park, Seoul (KR); Yoon-kyoung Cho, Suwon-si (KR); Beom-seok Lee, Hwaseong-si (KR); Jeong-gun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 627 days.

(21) Appl. No.: 12/133,396

(22) Filed: Jun. 5, 2008

(65) Prior Publication Data

US 2008/0314465 A1 Dec. 25, 2008

(30) Foreign Application Priority Data

Jun. 21, 2007 (KR) .................. 10-2007-0061128
Aug. 7, 2007 (KR) .................. 10-2007-0079175

(51) Int. Cl.
*F15C 1/04* (2006.01)

(52) U.S. Cl. ..................................... 137/828; 251/11

(58) Field of Classification Search .................. 137/825, 137/827, 828, 833; 251/11
See application file for complete search history.

(56) References Cited

U.S. PATENT DOCUMENTS

| 6,382,254 B1 * | 5/2002 | Yang et al. .................. 137/807 |
| 6,575,188 B2 * | 6/2003 | Parunak ..................... 137/251.1 |
| 6,679,279 B1 * | 1/2004 | Liu et al. ..................... 137/13 |
| 7,478,792 B2 * | 1/2009 | Oh et al. ..................... 251/11 |
| 2003/0156991 A1 | 8/2003 | Halas et al. |
| 2007/0092409 A1 * | 4/2007 | Beatty et al. ............... 422/100 |

FOREIGN PATENT DOCUMENTS

| FR | 2856046 A1 | 12/2004 |
| WO | 2006104467 A1 | 10/2006 |

OTHER PUBLICATIONS

Extended European search report dated Aug. 4, 2010, issued by the European Patent Office in counterpart European Patent Application No. 08158046.6-1252.

* cited by examiner

*Primary Examiner* — Craig M Schneider
(74) *Attorney, Agent, or Firm* — Sughrue Mion, PLLC

(57) ABSTRACT

Provided is a microfluidic valve, a method of manufacturing the microfluidic valve, and a microfluidic device that employs the microfluidic valve. The microfluidic valve includes a platform that includes two substrates combined facing each other; a channel having a first depth allowing a fluid to flow between the two substrates; a valve gap that is disposed on at least a region of the channel and has a second depth which is smaller than the first depth; and a valve plug that is disposed to fill the valve gap and is formed of a valve material made by mixing a phase change material, which is solid at room temperature, with a plurality of exothermic particles that emit an amount of heat sufficient to melt the phase change material by absorbing electromagnetic waves.

25 Claims, 11 Drawing Sheets

MICROFLUIDIC VALVE, METHOD OF MANUFACTURING THE SAME, AND MICROFLUIDIC DEVICE COMPRISING THE MICROFLUIDIC VALVE

CROSS-REFERENCE TO RELATED PATENT APPLICATIONS

This application claims priority from Korean Patent Application Nos. 10-2007-0061128, filed on Jun. 21, 2007 and 10-2007-0079175, filed on Aug. 7, 2007, in the Korean Intellectual Property Office, the disclosures of which are incorporated herein in their entireties by reference.

BACKGROUND OF THE INVENTION

1. Field of the Invention

Apparatuses and methods consistent with the present invention relate to a microfluidic valve, and more particularly, to a microfluidic valve for controlling flow of a fluid through structures in a platform, a method of manufacturing the microfluidic valve, and a microfluidic device including the microfluidic valve.

2. Description of the Related Art

Devices that perform a biological or chemical reaction by manipulating a small volume of a fluid are referred to as microfluidic devices. A microfluidic device includes microfluidic structures disposed in a platform, wherein the platform can have various shapes such as a chip shape or a disc shape. The microfluidic structures include chambers that can hold a fluid, channels through which the fluid can flow, and valves that can control the flow of the fluid. Thus, microfluidic devices can be manufactured by various combinations of these elements.

A device manufactured to perform various steps of fluid treatment and manipulation including experiments of biological reactions by disposing microfluidic structures in a flat chip form is referred to as a lab-on-a chip. In order to transport a fluid in a microfluidic structure, a driving pressure is required. As the driving force, a capillary force or pressure generated by an additional pump is used. Recently, disc type microfluidic devices that perform a series of operations by having microfluidic structures disposed in a flat disc form and moving a fluid through the microfluidic structures using a centrifugal force have been disclosed. This type of device is referred to as a Lab compact disk (CD) or a Lab-on a disc.

In order to perform complicated processes in microfluidic devices such as a Lab CD or a Lab-on a disc, a plurality of microfluidic valves that are disposed at various position to control the flow of a fluid are required. Also, in order to mass produce the microfluidic devices, a method of efficiently manufacturing the microfluidic valves together with chambers and channels has been desired.

A method of controlling the flow of a fluid using a phase change material that is a solid state at room temperature and is melted at a high temperature has been proposed. A biochemical reaction substrate disclosed in Anal. Chem. Vol. 76, 2004, pp 1824-1831 includes a valve formed of paraffin wax and a heating element for melting the paraffin wax. However, the valve included in the above substrate requires a large amount of paraffin wax in order to close minute channels, and a large heating element must be included to melt the large amount of paraffin wax. Thus, it is difficult to miniaturize or integrate the biochemical reaction substrate. Also, a long heating time is required to melt the paraffin wax and it is difficult to precisely control the opening time of channels.

SUMMARY OF THE INVENTION

The present invention provides a microfluidic valve that rapidly and accurately performs the operation of controlling flow of a fluid through structures in a platform by application of an external electromagnetic wave energy source and a microfluidic device including the same.

The present invention also provides a method of manufacturing the microfluidic valve with increased reliability and efficiency. In particular, the present invention provides a method of manufacturing the microfluidic valve, in which processes of manufacturing the microfluidic valve have minimal influence on other constituent elements when a microfluidic device that includes the microfluidic valve is manufactured.

According to an aspect of the present invention, there is provided a microfluidic valve including: a platform that comprises two substrates combined facing each other; a channel having a first depth so that a fluid flow between the two substrates; a valve gap that is disposed on at least a region of the channel and has a second depth which is shallower than the first depth; and a valve plug that is disposed to fill the valve gap and is formed of a valve material made by mixing a phase change material, which is solid at room temperature, with a plurality of exothermic particles that emit an amount of heat sufficient to melt the phase change material by absorbing electromagnetic waves.

The two substrates may be combined to each other by combining portions that comprise at least the outer walls of the channel. At least one of the two substrates comprises a protruding pattern formed along the outer walls of the channel and a surface of the protruding pattern is combined with a surface of the substrate that faces the protruding pattern.

The microfluidic valve may further including a valve material chamber disposed close to the channel to accommodate a valve material for forming the valve plug and connected to the valve gap so that smelted valve material moves to the valve gap. In this case, the two substrates may be combined to each other by combining portions that at least comprise outer walls of the channel and the valve material chamber. At least one of the two substrates may comprise a protruding pattern formed along the outer walls of the channel and the valve material chamber, and a surface of the protruding pattern may be combined with a surface of the substrate that faces the protruding pattern.

The phase change material may be one selected from a group consisting of a wax, a gel, and a thermoplastic resin. The wax may be one selected from a group consisting of paraffin wax, microcrystalline wax, synthetic wax, and natural wax. The gel may be one selected from a group consisting of polyacrylamide, polyacrylates, polymethacrylates, and polyvinylamides. The thermoplastic resin may be one selected from a group consisting of cyclic olefin copolymer (COC), polymethylmethacrylate (PMMA), polycarbonate (PC), polystyrene (PS), polyoxymethylene (POM), (perfluoralkoxy (PFA), polyvinylchloride (PVC), polypropylene (PP), polyethylene terephthalate (PET), polyetheretherketone (PEEK), polyamide (PA), polysulfone (PSU), and polyvinylidene fluoride (PVDF).

The exothermic particles may be metal oxide particles. The metal oxide particles may include at least one selected from a group consisting of $Al_2O_3$, $TiO_2$, $Ta_2O_3$, $Fe_2O_3$, $Fe_3O_4$, and $HfO_2$. The exothermic particles may be polymer particles, quantum dots, or magnetic beads.

According to an aspect of the present invention, there is provided a method of manufacturing a microfluidic valve including: (a) preparing an upper substrate and a lower substrate, which have a three-dimensional structure allowing formation of a channel having a first depth and a valve gap having a second depth formed in at least a portion of the channel region between the two substrates which face each other, wherein the second depth is shallower than the first depth; (b) distributing a melted valve material on a location of the lower substrate corresponding to the valve gap and solidifying the valve material; (c) forming a platform by combining the upper substrate and the lower substrate; and (d) forming a valve plug by filling the valve gap with the valve material in a melted state through the application of heat to the valve material from outside of the platform and then allowing the valve material to re-solidify in the valve gap, wherein the valve material is made by mixing a phase change material, which is a solid state at room temperature, with a plurality of exothermic particles that emit an amount of heat sufficient to melt the phase change material by absorbing electromagnetic waves.

The operation of (a) may comprise preparing a lower substrate having a three-dimensional structure that forms the channel and the valve gap on an upper surface thereof, and preparing an upper substrate that at least covers a region that comprises the three-dimensional structure. Also, the operation of (a) may comprise preparing a lower substrate having a three-dimensional structure which forms the channel, the valve gap, and a valve material chamber connected to the valve gap formed on an upper surface thereof, and an upper substrate that at least covers at least a region that comprises the three-dimensional structure, the operation of (b) may comprise disposing the valve material in the valve material chamber, and the operation of (d) may comprise filling the valve gap by moving the melted valve material to the valve gap.

As a first method of increasing the reliability of combining the upper substrate and the lower substrate, the operation of (a) may comprise a lower substrate that further comprises a protruding pattern formed along the outer walls of the three-dimensional structure, and an upper substrate that at least covers a region that comprises the three-dimensional structure and the protruding pattern, and the operation of (c) may comprise combining the lower substrate by covering it with the upper substrate after an adhesive is coated on a surface of the protruding pattern of the lower substrate.

As a second method of increasing the reliability of combining the upper substrate and the lower substrate, the operation (a) may comprise preparing a lower substrate that comprises a protruding pattern formed along the outer walls of the three-dimensional structure and an upper substrate that at least covers a region that covers the three-dimensional structure and the protruding pattern, and the operation of (c) may comprise coupling the lower substrate by covering with the upper substrate after coating an adhesive on the upper substrate in a shape corresponding to the shape of the protruding pattern.

In manufacturing a microfluidic valve having a valve material chamber, the operation (d) may comprise radiating electromagnetic waves to the valve material until a portion of the valve material in the valve material chamber vaporizes, and moving the melted valve material into the valve gap by vapor pressure of the vaporized valve material.

According to another aspect of the present invention, there is provided a microfluidic device including: a platform that comprises two substrates coupled facing each other; and a microfluidic structure that is disposed in the platform and comprises at least a chamber, a channel, and a microfluidic valve for manipulating a microfluid, wherein the microfluidic valve comprises: a channel having a first depth to allow a fluid to flow between the two substrates; a valve gap that is disposed on at least a region of the channel and has a second depth which is shallower than the first depth; and a valve plug that is disposed to fill the valve gap and is formed of a valve material made by mixing a phase change material, which is solid at room temperature, with a plurality of exothermic particles that emit an amount of heat sufficient to melt the phase change material by absorbing electromagnetic waves.

The two substrates may be coupled to each other by adhering portions that at least comprise outer walls of the microfluidic structure. At least one of the two substrates may comprise a protruding pattern formed along the outer walls of the microfluidic structure, and a surface of the protruding pattern may be combined with a surface of the substrate that faces the protruding pattern.

The microfluidic device may further comprise a valve material chamber disposed close to the channel to accommodate the valve material for forming the valve plug and connected to the valve gap so that the valve material in a fluid state moves to the valve gap.

The platform may have a rotatable disc shape, and a fluid in the microfluidic structure may be moved by centrifugal force generated by rotation of the platform.

BRIEF DESCRIPTION OF EXEMPLARY EMBODIMENTS

The above and other aspects of the present invention will become more apparent by describing in detail exemplary embodiments thereof with reference to the attached drawings, in which.

DETAILED DESCRIPTION OF EXEMPLARY EMBODIMENTS

The present invention will now be described more fully with reference to the accompanying drawings in which exemplary embodiments of the invention are shown.

Figure 1:
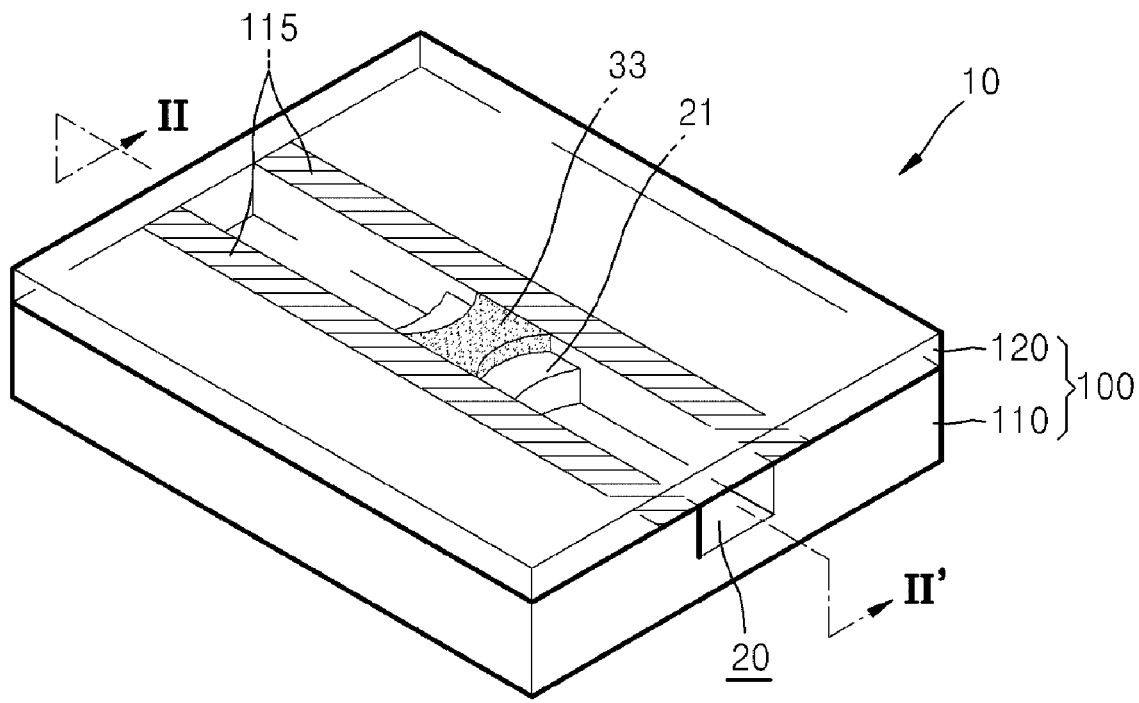
FIG. 1 is a perspective view of a microfluidic valve according to an exemplary embodiment of the present invention.
Figure 2:
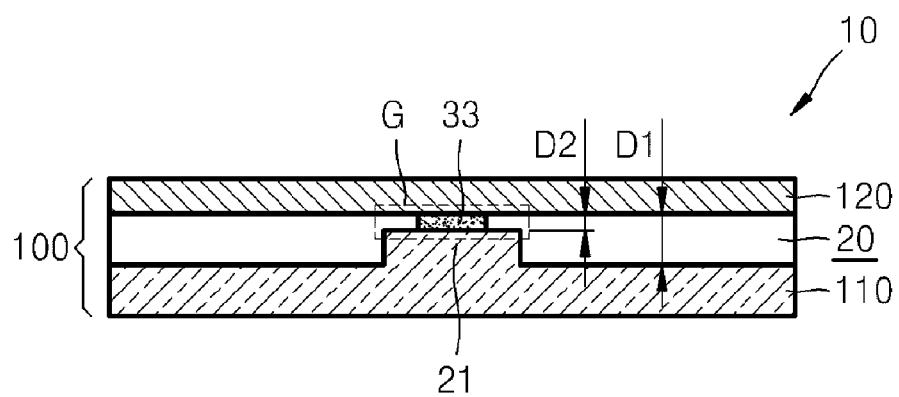
FIG. 2 is a cross-sectional view taken along line II-II' of the microfluidic valve of FIG. 1, according to an exemplary embodiment of the present invention.

FIG. 1 is a perspective view of a microfluidic valve 10 according to an exemplary embodiment of the present invention. FIG. 2 is a cross-sectional view taken along line II-II' of the microfluidic valve 10 of FIG. 1. The microfluidic valve 10 in FIGS. 1 and 2 is an example of a microfluidic valve that can be employed in a microfluidic device that performs a biological or chemical reaction by manipulating a minute fluid in a platform 100. The platform 100 can have various shapes or forms of a chip such as a rectangular shape, or a disc shape, a fan shape, or a trapezoidal shape. Both ends of a channel 20 of the microfluidic valve 10 can be connected to structures such as a chamber or other channels disposed in the platform 100 of the same type (refer to FIG. 9).

The platform 100 can be formed of a plastic material that is easily molded and a surface of which is biologically inactive, such as polymethyl methacrylate (PMMA), polydimethylsiloxane (PDMS), or polycarbonate (PC). However, the materials for forming the platform 100 are not limited thereto, that is, any material that has chemical and biological stability, optical transparency, and mechanical processability can be used. The platform 100 can be made of an upper substrate 120 and a lower substrate 110. In the platform 100, a space for storing or flowing a fluid can be provided by combining three-dimensional structures (for example, three-dimensional structures formed by engraving) corresponding to a chamber (not shown) or a channel 20 on surfaces of the upper substrate 120 and the lower substrate 110 facing each other. The combining of the upper substrate 120 and the lower substrate 110 can be achieved by various methods such as bonding using an adhesive or a dual-sided tape, a solvent bonding, an ultra sonic welding or a laser welding.

According to the present exemplary embodiment, the microfluidic valve 10 includes the channel 20 having a first depth D1 and a valve gap G that is disposed in a portion of the channel 20 and has a second depth D2 smaller than the first depth D1. The valve gap G is defined by an upper surface of a valve gap forming unit 21 which protrudes from the bottom of the channel 20 and a lower surface of the upper substrate 120 of the platform 100. The second depth D2 of the valve gap G can be a depth that can be filled with a valve material (which will be described later) by a capillary force when the valve material is melted. The actual size of the second depth D2 can be determined in consideration of various factors such as a contact angle between the melted material and the upper and lower substrate 120 and 110. As an example, when the depth D1 of the channel 20 is 1 mm, the second depth D2 of the valve gap G can be 0.1 mm.

A valve plug 33 that blocks the flow of the fluid through the valve gap G is disposed in the valve gap G. The valve plug 33 fills the valve gap G in a widthwise direction in a process of re-solidifying the valve material after the valve material disposed in the valve gap G is melted in the course of manufacturing the microfluidic valve 10 by electromagnetic wave energy radiated from the outside of the platform 100.

The valve material that constitutes the valve plug 33 is made by mixing a phase change material with a plurality of exothermic particles that emit heat to some degree by absorbing electromagnetic wave energy, thus melting the phase change material. The phase change material can be wax. When the wax is heated, the wax turns to a liquid state by melting. The wax can be a paraffin wax, a microcrystalline wax, a synthetic wax, or a natural wax.

The phase change material can be a gel or a thermoplastic resin. The gel can be polyacrylamide, polyacrylates, polymethacrylates, or polyvinylamides. The thermoplastic resin can be a cyclic olefin copolymer (COC), polymethylmethacrylate (PMMA), polycarbonate (PC), polystyrene (PS), polyoxymethylene (POM), (perfluoralkoxy (PFA), polyvinylchloride (PVC), polypropylene (PP), polyethylene terephthalate (PET), polyetheretherketone (PEEK), polyamide (PA), polysulfone (PSU), or polyvinylidene fluoride (PVDF).

The exothermic (heat generating) particles can have a diameter of 1 nm to 100 μm so that the exothermic particles can freely move in the valve gap G. The exothermic particles have a characteristic of emitting heat by rapidly increasing temperature when electromagnetic wave energy is supplied, for example, by radiating a laser, and being uniformly distributed in the wax. Each of the exothermic particles can have a structure of a core including a metal component and a hydrophobic surface surrounding the core in order to have the above characteristic. For example, the exothermic particle can have a particle structure including a core formed of Fe and a plurality of surfactant components that surroundingly combine with Fe.

In a related art, the exothermic particles are kept in a state in which the exothermic particles are dispersed in a carrier oil. The carrier oil may also be hydrophobic so that the exothermic particles having a hydrophobic surface structure can be uniformly dispersed in the carrier oil. The valve material can be made by mixing the melted phase change material with the carrier oil in which the exothermic particles are dispersed.

The exothermic particles are not limited to specific shapes, and other forms such as quantum dots or magnetic beads can be used. Also, the exothermic particles can be metal oxide particles, for example, $Al_2O_3$, $TiO_2$, $Ta_2O_3$, $Fe_2O_3$, $Fe_3O_4$, or $HfO_2$.

The upper substrate 120 and the lower substrate 110 that constitute the platform 100 have a combining (coupling) unit 115 in which portions of surfaces facing each other are combined. The combining unit 115 includes outer walls of the channel 20 to prevent the fluid from leaking. The combining unit 115 can be formed in a band shape along the outer wall of the channel 20. The combining unit 115 can be formed in various shapes according to the method of joining the upper substrate 120 and the lower substrate 110. For example, if an adhesive is used, the adhesive is coated either on a lower surface of the upper substrate 120 or an upper surface of the lower substrate 110 having a shape described above using a patterning method such as an ink jet printing method, and afterwards, the upper substrate 120 and the lower substrate 110 are joined to each other.

The combining unit 115 can include a protruding pattern (not shown) formed to surround the outer walls of the channel 20. For example, after an engraved structure that defines the channel 20 is formed on the upper surface of the lower substrate 110 and a protruding pattern (not shown) having a portion of a band shape that includes the outer walls of the channel 20 higher than the other portion is formed, the surface of the protruding pattern can be combined to the lower surface of the upper substrate 120. An aspect of this type of exemplary embodiment will further be clarified by the descriptions with respect to FIGS. 7 through 9.

The microfluidic valve 10 described above is a normally closed valve. That is, before operating, the microfluidic valve 10 blocks flow of a fluid by closing the valve gap G; however, during operation, the microfluidic valve 10 allows the flow of the fluid by opening the valve gap G. In order to operate the microfluidic valve 10, an electromagnetic wave energy source identical to the electromagnetic wave energy source used for forming the valve plug 33 can be used. When an electromagnetic wave, for example, a laser beam is radiated onto the valve plug 33, exothermic particles dispersed in the valve plug 33 rapidly emit heat by absorbing the electromagnetic wave energy. The phase change material is melted by the heat, and thus, the valve material that constitutes the valve plug 33 has fluidity. At this point, when pressure is applied to an end of the channel 20, the melted valve material is moved to a deeper portion of the channel 20 outside the valve gap G. As a result, a fluid can flow through the channel 20.

The results of an experiment for the measuring reaction time of the microfluidic valve 10 are as follows. In a test chip used in the experiment, a pressure of a fluid was maintained at 46 kPa. In order to maintain the pressure, a syringe pump (Havard PHD2000, USA) and a pressure sensor (MPX 5500DP, Freescale semiconductor Inc., AZ, USA) were used. An emission wavelength of the electromagnetic wave energy source (not shown) was 808 nm, and a laser light source having an output of 1.5 W was used. Data regarding the reaction time of the microfluidic valve 10 was obtained from the analysis of resultant pictures taken by a high speed camera (Fastcam-1024, Photron, CA, USA). The valve material was made by mixing a ferrofluid, in which magnetic beads having an average diameter of 10 nm as the exothermic particles were dispersed in a carrier oil, with a paraffin wax were mixed 1:1, that is, a magnetic wax in which a volume fraction of the ferrofluid is 50% was used. Generally, the higher the volume fraction of the ferrofluid, the shorter the reaction time. However, if the volume fraction of the ferrofluid is 70% or more, the maximum hold-up pressure of the valve plug 33 is reduced. Thus, the volume fraction of the ferrofluid to be included in the valve plug 33 of the microfluidic valve 10 can be determined through consideration of the requirement of a reaction time and the requirement of a maximum hold-up pressure.

The reaction time of wax valve from when commencing of radiating of a laser beam onto the valve plug 33 of the microfluidic valve 10 to open the channel by melting the valve plug 33 was 0.012 sec. Considering that a conventional reaction time of wax valve is 2 to 10 seconds, the reaction time of wax valve according to the present exemplary embodiment is significantly short.

Figure 3:
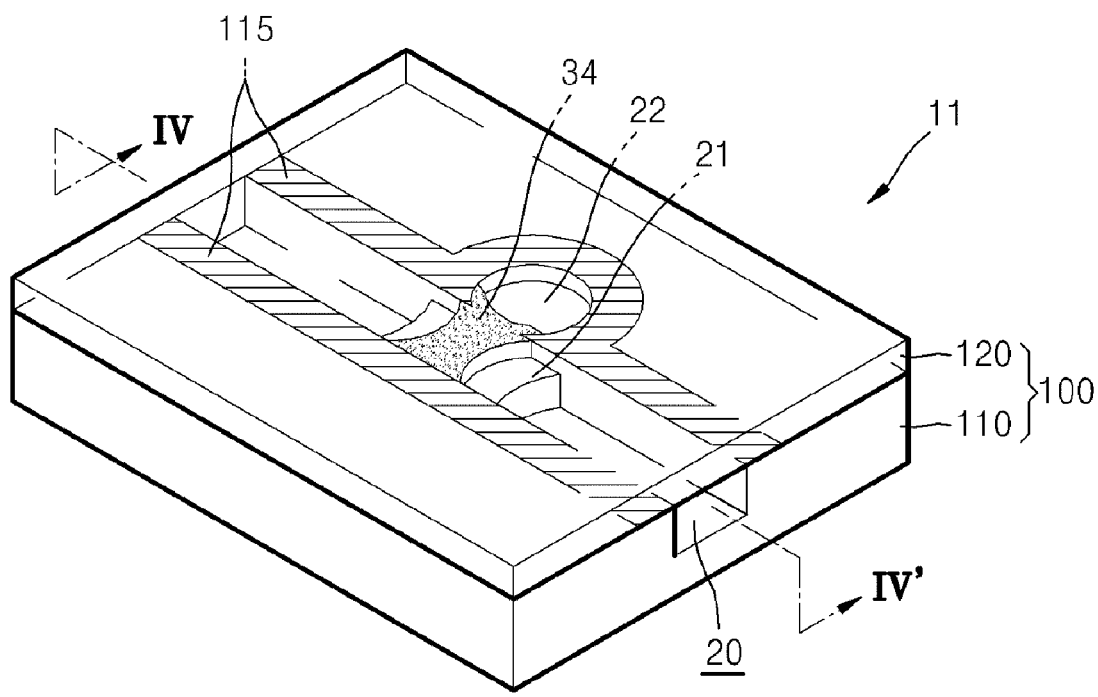
FIG. 3 is a perspective view of a microfluidic valve according to another embodiment of the present invention according to another exemplary embodiment of the present invention.
Figure 4:
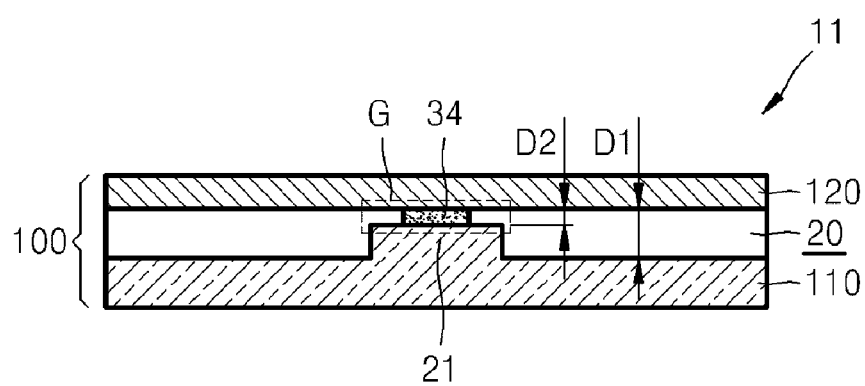
FIG. 4 is a cross-sectional view taken along line IV-IV' of the microfluidic valve of FIG. 3, according to another exemplary embodiment of the present invention.

FIG. 3 is a perspective view of a microfluidic valve 11 according to another exemplary embodiment of the present invention. FIG. 4 is a cross-sectional view taken along line IV-IV' of the microfluidic valve of FIG. 3. The microfluidic valve 11 according to the present exemplary embodiment further includes a valve material chamber 22 that stores a valve material for forming a valve plug 34. The valve material chamber 22 is disposed close to the valve gap G and is connected to the valve gap G. In a process of manufacturing the microfluidic valve 11, the valve material filled in the valve material chamber 22 moves into the valve gap G in a melted state obtained by the application of an electromagnetic wave energy source (not shown) supplied from an outside of the platform 100 and forms the valve plug 34 by re-solidifying. In this case, the combining unit 115 may be formed along outer walls of the channel 20 and the valve material chamber 22.

The microfluidic valve 11 according to the present exemplary embodiment can be used as a normally closed valve like the microfluidic valve 10 of FIG. 1, and can also be used as a normally opened valve. If the microfluidic valve 11 is used as a normally opened valve, the microfluidic valve 11 can be in a state in which the valve gap G is opened and the valve material chamber 22 is filled with the valve material. In order to block the flow of fluid through the channel 20, the valve material filled in the valve material chamber 22 is melted by applying electromagnetic wave energy. Thus, due to the pressure caused by the volume expansion of the valve material, the valve material is moved into the valve gap G and blocks the flow of fluid. At this point, the amount of electromagnetic wave energy to be applied to the valve material in the valve material chamber 22 may be an amount that can vaporize a portion of the valve material to rapidly expand the volume thereof.

A method of manufacturing a microfluidic valve 10 according to an exemplary embodiment of the present invention will now be described with reference to FIGS. 5A through 5C. The method of manufacturing a microfluidic valve 10 described below can also be applied to manufacture a microfluidic device that includes the microfluidic valve 10 according to an exemplary embodiment of the present invention.

Figure 5A:
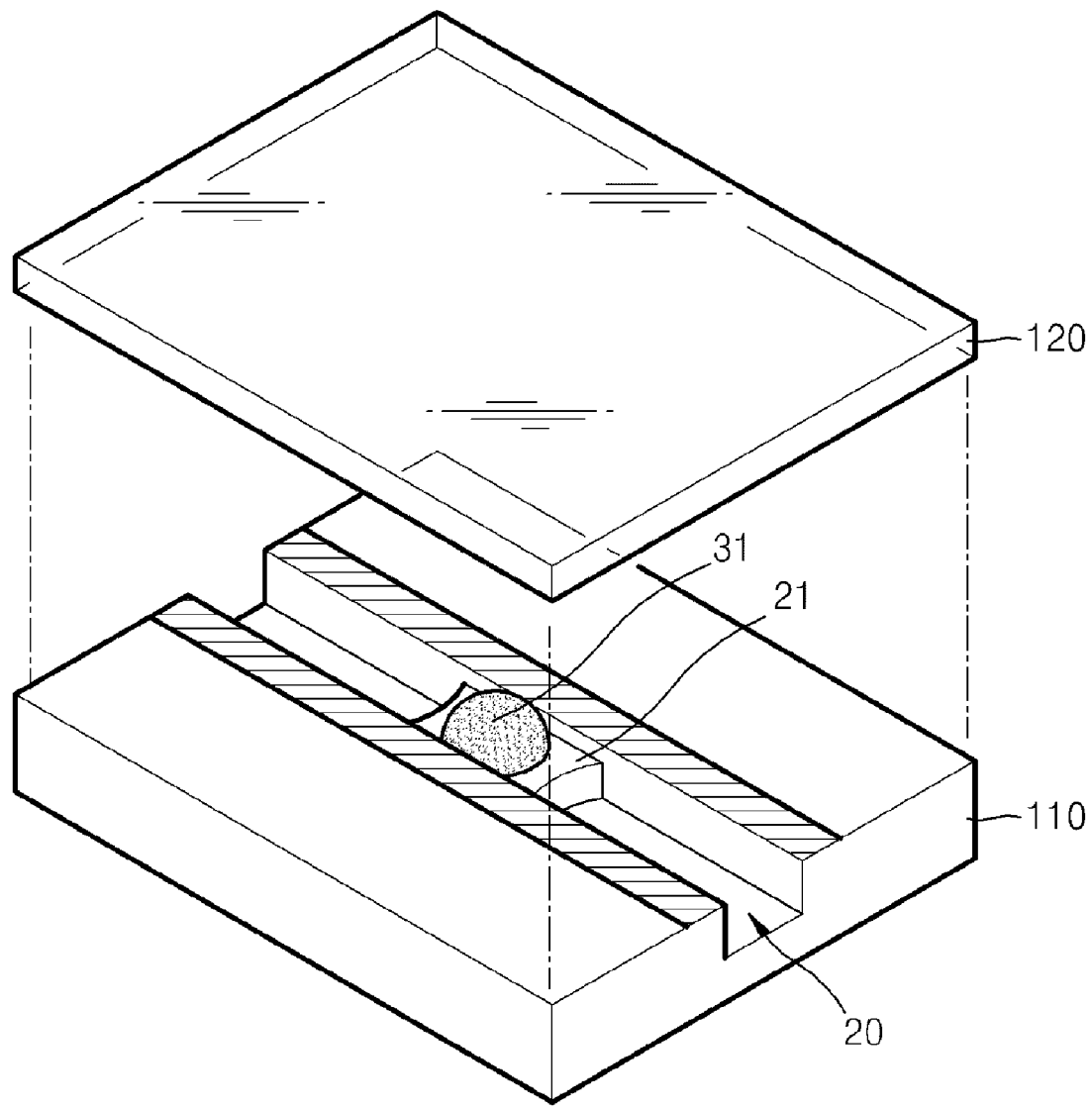
FIGS. 5A through 5C are perspective views illustrating a method of manufacturing the microfluidic valve of FIG. 1, according to an exemplary embodiment of the present invention.
Figure 5B:
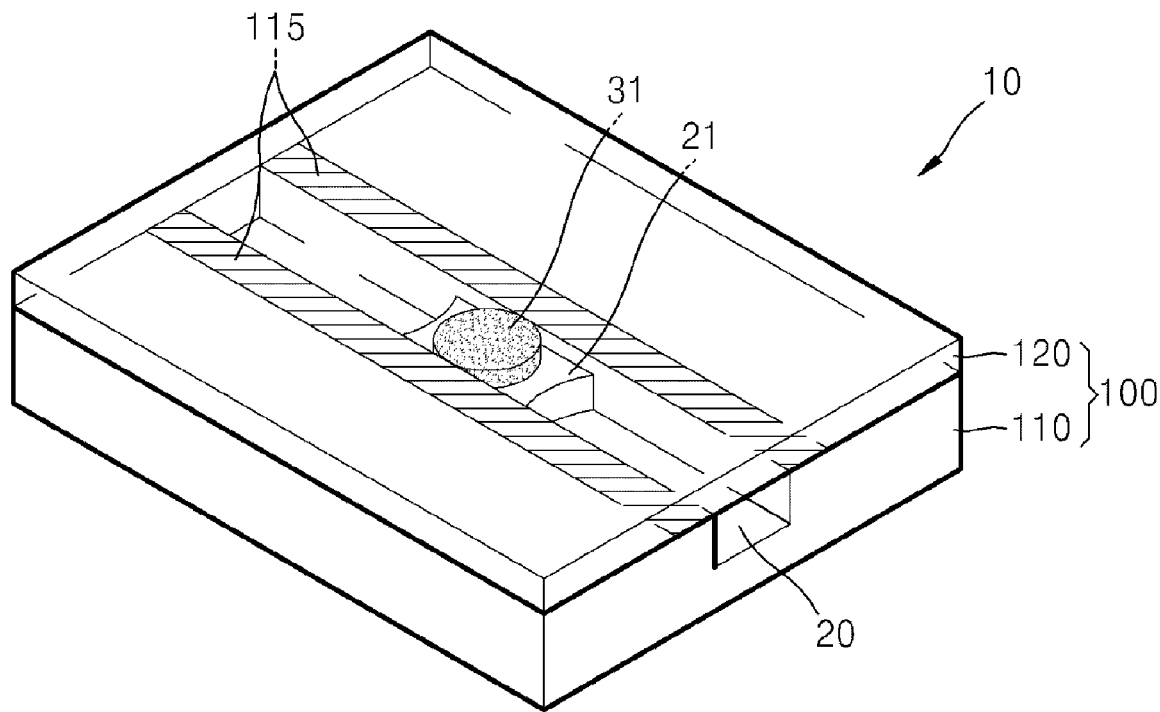
Figure 5C:
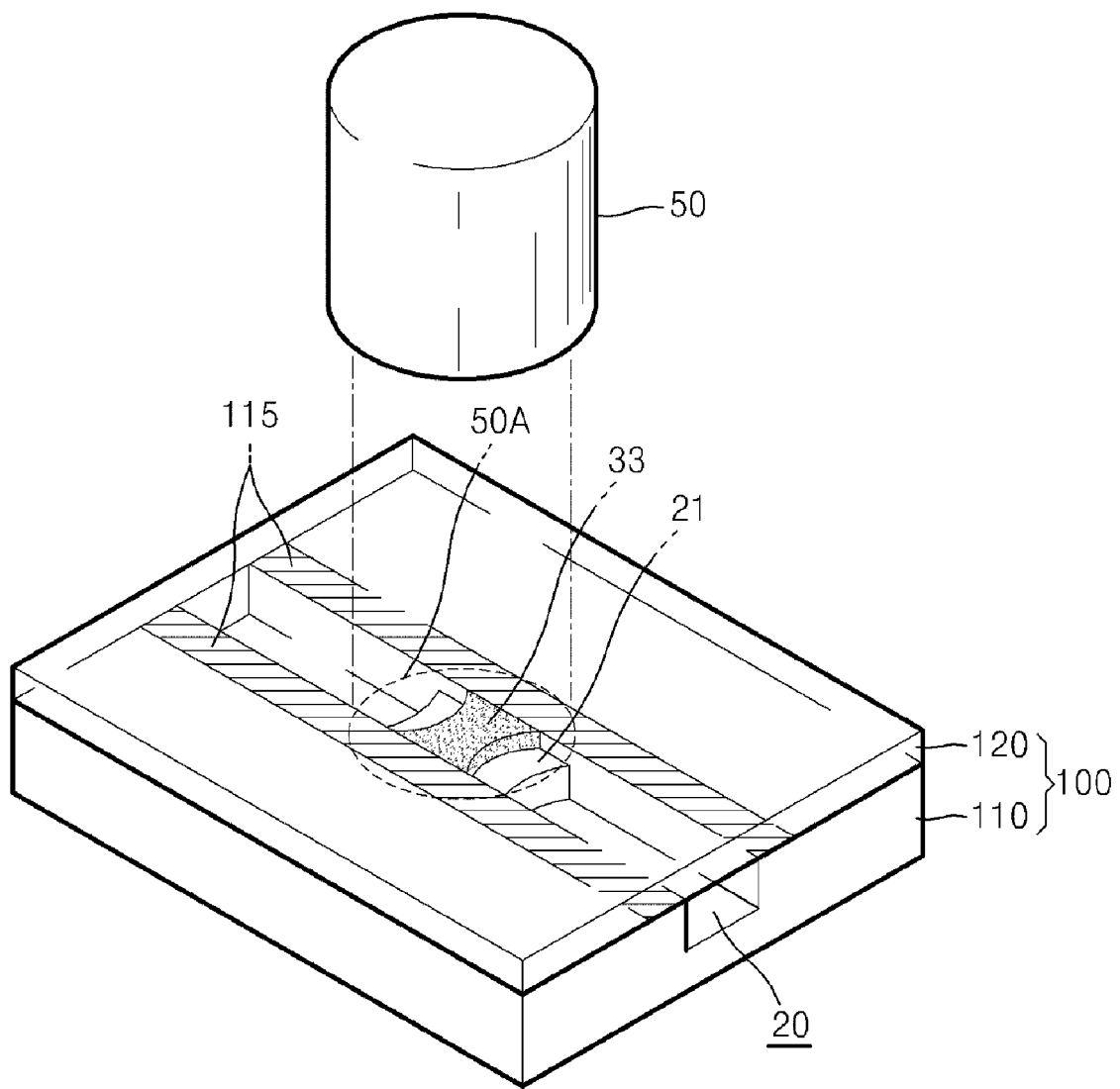

FIGS. 5A through 5C are perspective views illustrating a method of manufacturing the microfluidic valve 10 of FIG. 1, according to an exemplary embodiment of the present invention. A lower substrate 110 and an upper substrate 120 are prepared. A three-dimensional structure that provides the channel 20 and a valve gap forming unit 21 is formed on an upper surface of the lower substrate 110. As depicted in FIG. 5A, the three-dimensional structure can be an engraved structure. However, the three-dimensional structure is not limited thereto, that is, it can be any structure that can define a width and a depth of the channel 20 and the valve gap forming unit 21. The lower substrate 110 having the above three-dimensional structure can be formed by etching or cutting a flat shape substrate, or can be molded using a mold. Another flat shape substrate can be employed as the upper substrate 120. The upper substrate 120 may have high transmittance with respect to electromagnetic waves, and more preferably, may be optically transparent. The upper substrate 120 may not have a hole at least in a region that faces the valve gap forming unit 21. Since a hole is not formed in the upper substrate 120, the molding of the upper substrate 120 is easy and leakage of a fluid or pressure loss through the hole can be prevented.

Next, a predetermined amount of melted valve material 31 is distributed on the valve gap forming unit 21. At this point, the amount of the valve material 31 can be determined in consideration of a depth and a width of the valve gap G and required internal pressure. The distribution of the valve material 31 can be performed at room temperature, and the distributed liquid state valve material 31 is solidified.

Next, referring to FIG. 5B, the lower substrate 110 and the upper substrate 120 are combined. As described above, the combining of the lower substrate 110 and the upper substrate 120 can be achieved by various ways, such as using an adhesive or a dual-sided adhesive tape, a solvent bonding, an ultrasonic welding, or a laser welding. In the present exemplary embodiment, a method of combining using an adhesive is described. An adhesive is coated on the combining unit 115 that includes the outer walls of the channel 20. At this point, a surface on which the adhesive is coated can be an upper surface of the lower substrate 110 or a lower surface of the upper substrate 120. After the adhesive is coated, the lower substrate 110 and the upper substrate 120 are pressed together and bonded to form the platform 100.

Next, referring to FIG. 5C, electromagnetic waves are radiated onto a region 50A that includes a valve gap using an electromagnetic wave energy source 50 provided from an outside of the platform 100. The electromagnetic wave energy source 50 can be, for example, a laser source that at least includes one laser diode. The laser emitted from the laser source may have energy which does not change a structure in the platform 100 and the characteristics of the valve material, and can be a pulse laser having an output of at least 1 mJ/pulse or more, or alternatively, a continuous wave laser having an output of at least 14 mW or more. A laser radiated from the laser source may have a wavelength of 400 to 1300 nm.

However, the electromagnetic wave energy source 50 according to the exemplary embodiment of the present invention is not limited thereto, and can be an apparatus that can radiate a predetermined wavelength band of one selected from the group consisting of microwaves, infrared rays, visible light, ultraviolet rays, and X rays. Furthermore, an apparatus that can intensively radiate electromagnetic waves on a target a short distance away may be desirable, but not necessary. The wavelength of the electromagnetic wave energy source 50 may be in a range that can be readily absorbed by the exothermic particles included in the valve material. Thus, an element that generates electromagnetic waves in the electromagnetic wave energy source can be appropriately selected according to the material and surface conditions of the exothermic particles.

When the valve material 31 is melted in the valve gap using the electromagnetic wave energy source 50, the melted valve material fills the valve gap in a width direction of the valve gap due to a capillary force between the valve gap forming unit 21 and the upper substrate 120. If further electromagnetic wave energy is not applied to the valve material 31, the valve material 31 is re-solidified, and thus, the valve material 31 forms the valve plug 33 to block the flow of fluid. However, a method of locally applying heat onto the region 50A that includes the valve gap so that the valve material 31 can form the valve plug 33 is not limited to the above described method. For example, the valve material 31 and the valve gap can be heated by thermal conduction by bringing a heat source such as a thermal plate locally into contact with the region 50A that includes the valve gap.

Figure 6A:
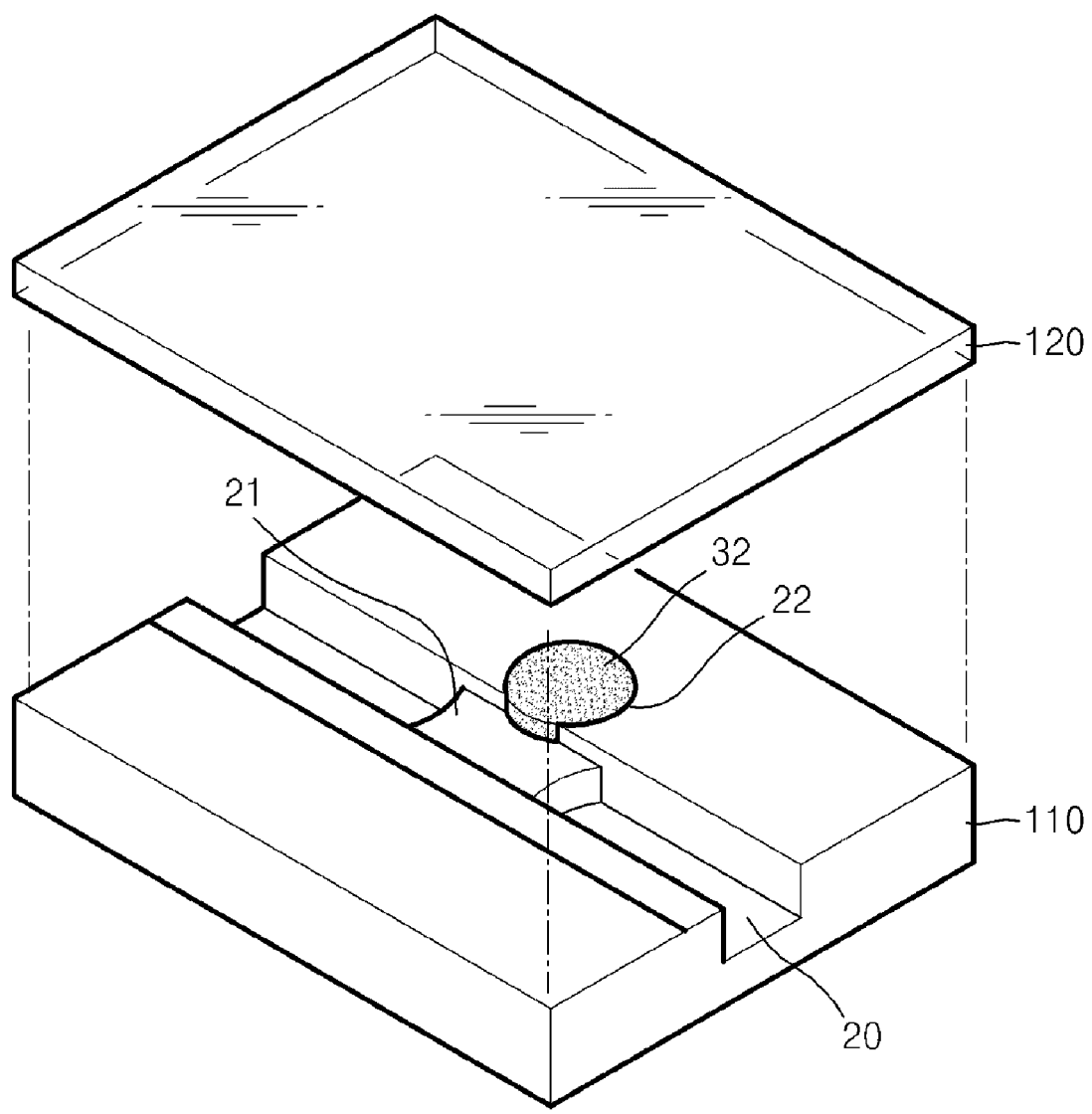
FIGS. 6A through 6C are perspective views illustrating a method of manufacturing the microfluidic valve of FIG. 3, according to another exemplary embodiment of the present invention.
Figure 6B:
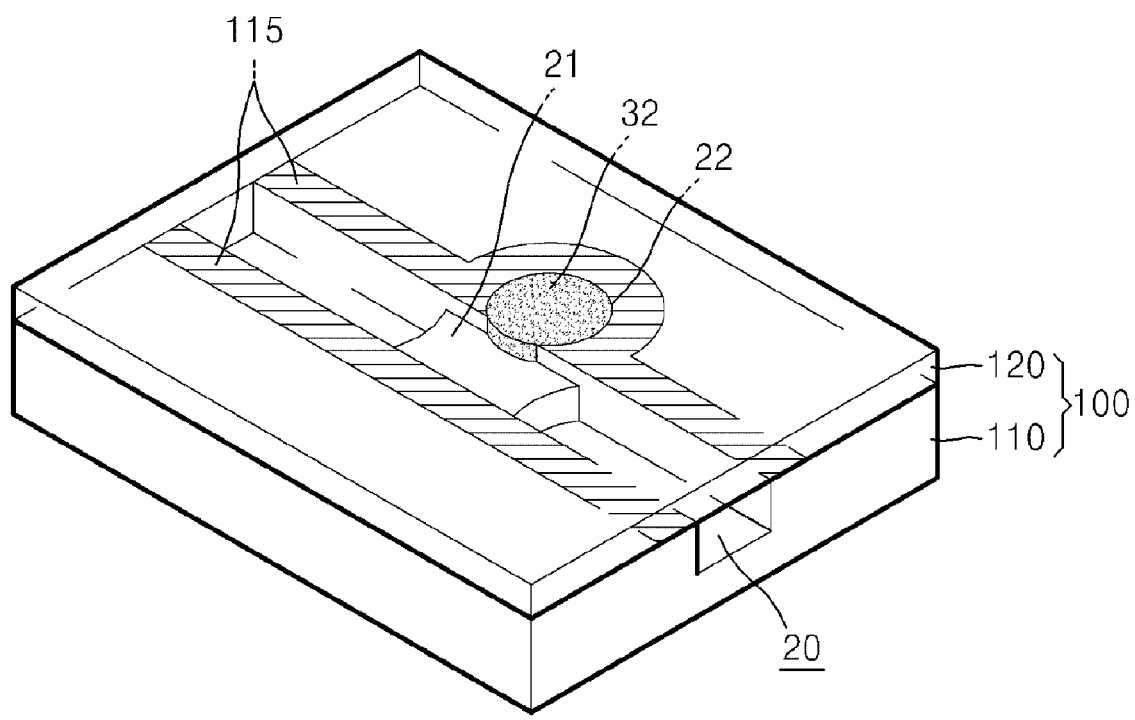
Figure 6C:
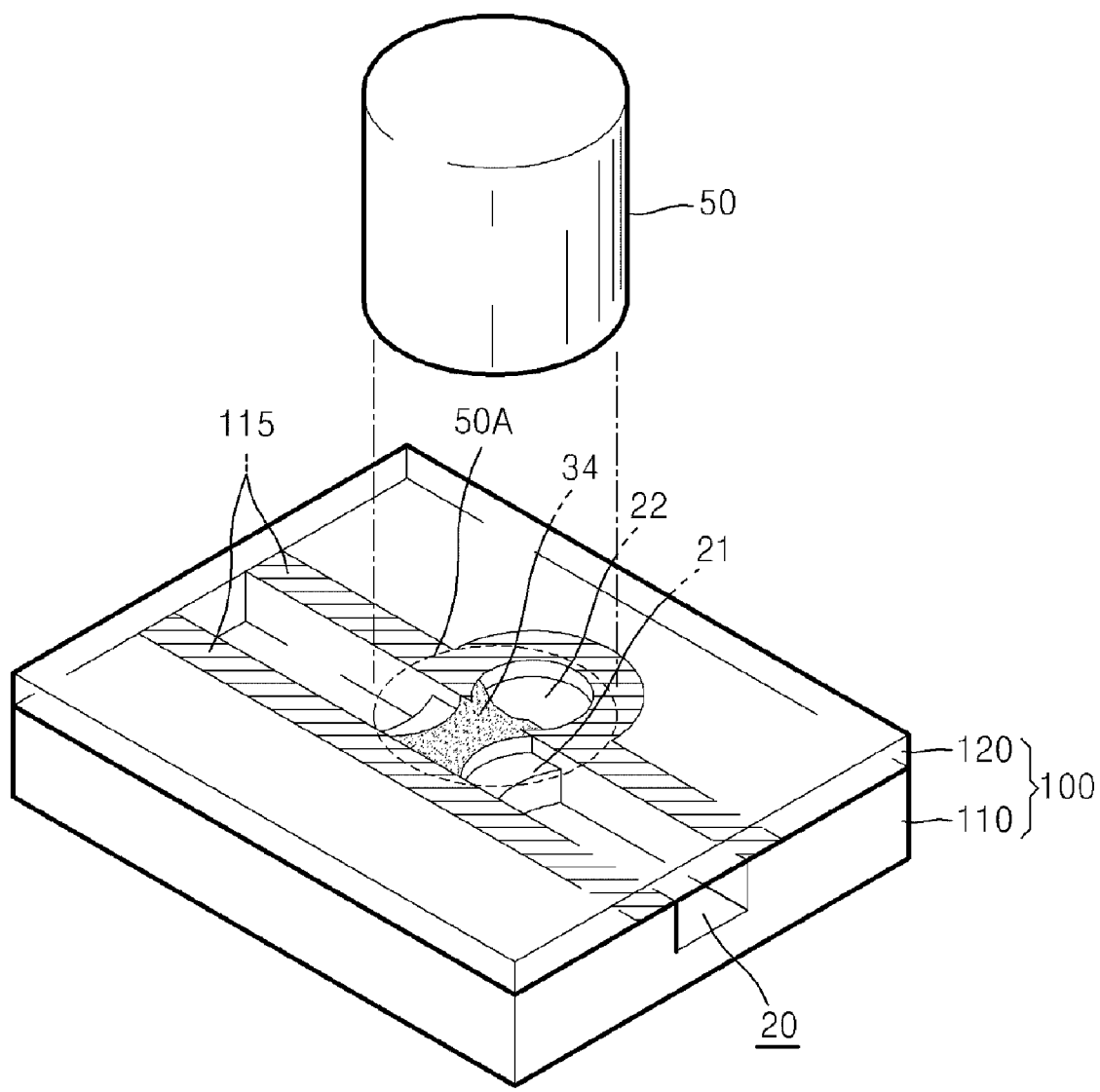

FIGS. 6A through 6C are perspective views illustrating a method of manufacturing the microfluidic valve of FIG. 3, according to another exemplary embodiment of the present invention. Referring to FIG. 6A, an upper substrate 120 and a valve material 31 are prepared. When the lower substrate 110 is prepared, in addition to the channel 20 and the valve gap forming unit 21, a three-dimensional structure that defines a valve material chamber 22 may be prepared. The valve material chamber 22 may be provided by an engraved structure. Next, a predetermined amount of melted valve material 32 is distributed in the valve material chamber 22. This process can be performed at room temperature.

Next, the lower substrate 110 and the upper substrate 120 are combined to form a platform 100. A combining unit 115 where the two substrates 110 and 120 are combined may include at least the outer walls of the channel 20 and the valve material chamber 22. If the microfluidic valve 11 is employed as a normally open valve, the manufacturing process is at this point complete.

If the microfluidic valve 11 is employed, however, as a normally closed valve after the combining process, electromagnetic waves are radiated onto the region 50A that includes the valve material chamber 22 using an electromagnetic wave energy source 50 from an outside of the platform 100. Thus, the valve material 32 in the valve material chamber 22 is melted and moves to a gap between the valve gap forming unit 21 and the upper substrate 120, that is, into the valve gap. At this point, the electromagnetic wave energy can be applied until a portion of the valve material 32 is vaporized in the valve material chamber 22 so that the melted valve material 32 can be moved to the outside of the valve material chamber 22 due to pressure caused by rapid volume expansion of the valve material 32. The valve material 32 that fills the valve gap forms a valve plug 34 by re-solidifying when the supply of the electromagnetic wave energy is stopped. Also, in this case, the method of locally applying heat to the region 50A that includes the valve gap so that the valve material 32 can form the valve plug 34 is not limited thereto. For example, the valve material 32 and the valve gap can be heated by thermal conduction by bringing a heat source such as a thermal plate locally into contact with the region 50A that includes the valve gap.

Figure 7:
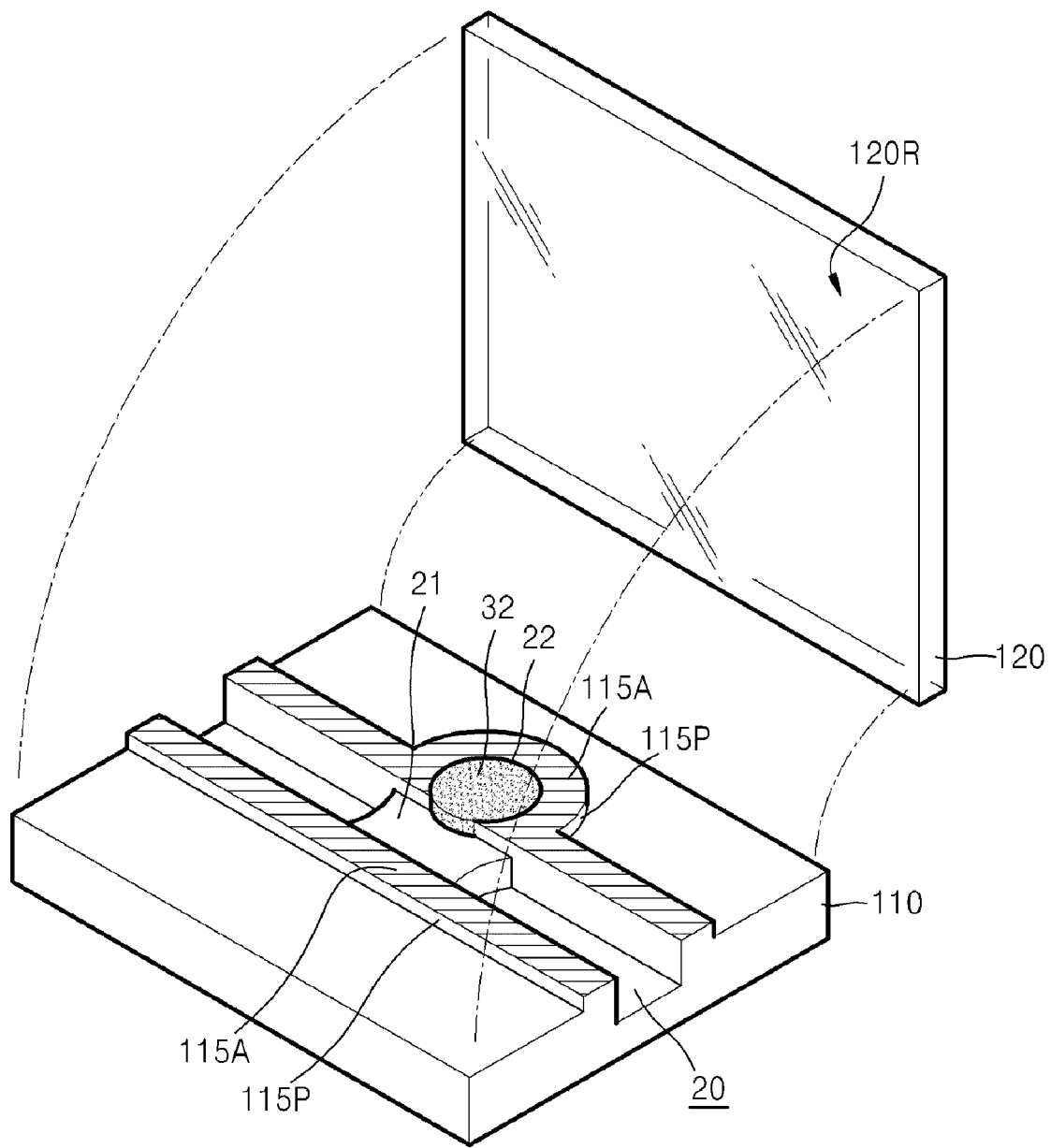
FIG. 7 is a perspective view illustrating a method of combining an upper substrate and a lower substrate in the course of manufacturing a microfluidic valve according to an exemplary embodiment of the present invention.

FIG. 7 is a perspective view illustrating a method of combining the upper substrate 120 and the lower substrate 110 in the course of manufacturing a microfluidic valve according to an exemplary embodiment of the present invention. If air traps are formed in a combining unit when the upper substrate 120 and the lower substrate 110 are combined, there are risks of leakage of a fluid, pressure loss, or re-separation of the combining unit. In order to prevent these risks, when the lower substrate 110 is prepared, a protruding pattern 115P can be formed on portions that include the outer walls of the channel 20 and the valve material chamber 22. The protruding pattern 115P is formed to have a height greater than the rest areas and a flat surface. The protruding pattern 115P can be formed to a band shape along the outer walls of the channel 20 and the valve material chamber 22. The height of the protruding pattern 115P defines the width and the depth of the channel 20 together with the three-dimensional pattern.

At this point, a flat shape substrate may be employed as the upper substrate 120, or another protruding pattern (not shown) corresponding to the protruding pattern 115P of the lower substrate 110 may be formed on a lower surface of the upper substrate 120.

After the upper substrate 120 and the lower substrate 110 are prepared, an adhesive 115A can be coated on the surface of the protruding pattern 115P. The adhesive 115A can be a liquid state adhesive and can be selectively coated on the surface of the protruding pattern 115P using a patterning method such as an inkjet printing method.

Figure 8:
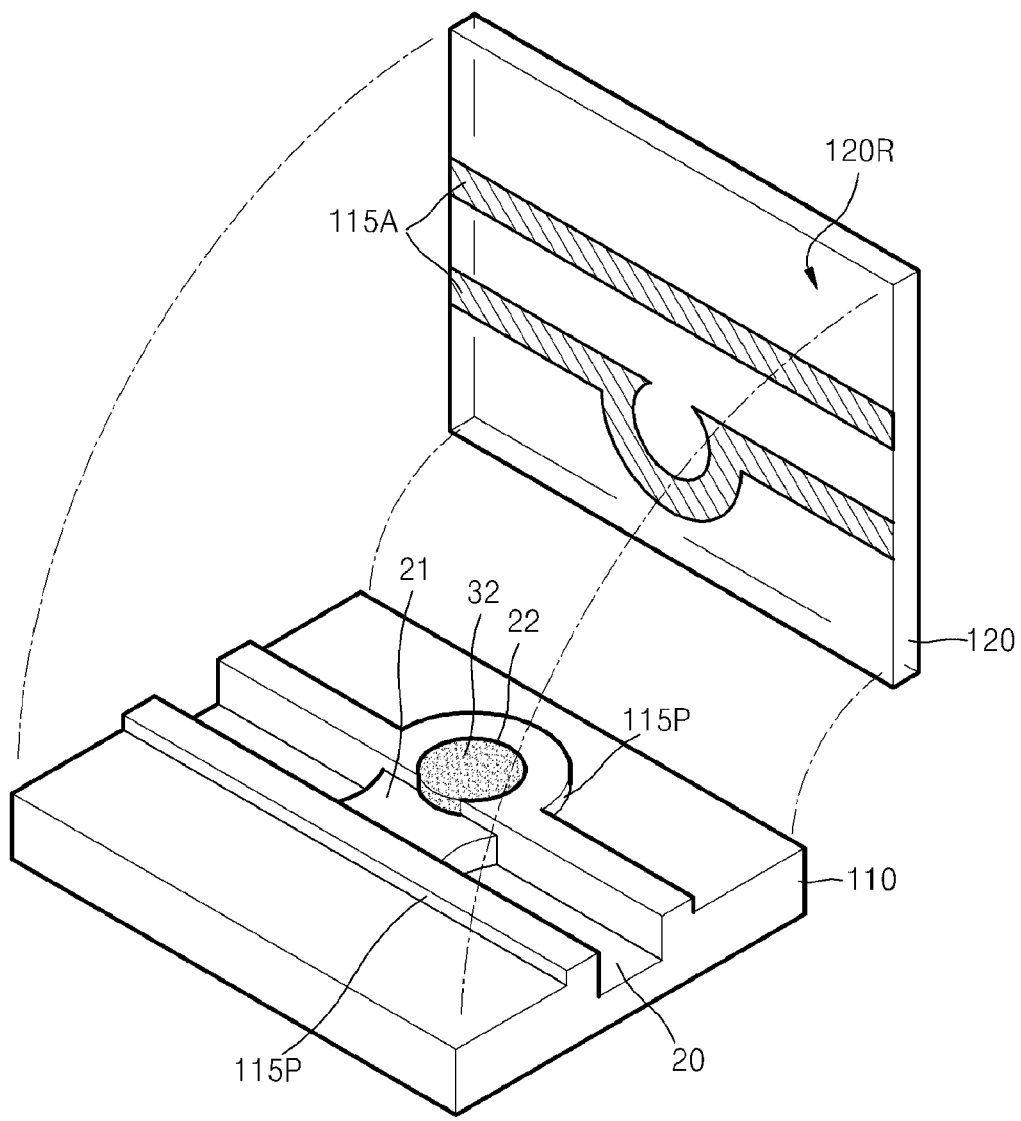
FIG. 8 is a perspective view illustrating another method of combining an upper substrate and a lower substrate in the course of manufacturing a microfluidic valve according to an exemplary embodiment of the present invention.

FIG. 8 is a perspective view illustrating another method of combining an upper substrate and a lower substrate in the course of manufacturing a microfluidic valve according to an exemplary embodiment of the present invention. Referring to FIG. 8, a lower substrate 110 having a protruding pattern 115P and an upper substrate 120 having a flat shape are prepared. Afterwards, an adhesive 115A is coated on a lower surface of the upper substrate 120 in a shape corresponding to the protruding pattern 115P.

Also, in this case, the adhesive 115A can be a liquid state, and can be coated using a patterning method such as an inkjet printing method. If an inkjet printing method is used, ejected volume of droplets of the liquid state adhesive 115A can be 1 pl to 100 μl. The adhesive 115A can be, for example, an ultraviolet (UV) hardening adhesive. In this case, after coating of the adhesive 115A, the two substrates 110 and 120 are pressed against each other, and UV rays are radiated onto the combined unit. At this point, if a force is applied to the two substrates 110 and 120 in a direction of pressing the two substrates 110 and 120, pressure is concentrated on the surface of the protruding pattern 115P and on a lower surface 120R of the upper substrate 120 corresponding to the surface of the protruding pattern 115P, and thus, the reliability of the combining is increased. The type of energy that is applied to the combining unit may differ according to the kind of adhesive and method of combining.

As described above, the method of coating the adhesive 115A on a lower surface of the upper substrate 120 prevents the adhesive 115A from entering into the channel 20 leading the reduction of flow channel or from mixing with a reaction solution injected in advance into a chamber (not shown) in the lower substrate 110 in the course of coating the adhesive 115A.

Figure 9:
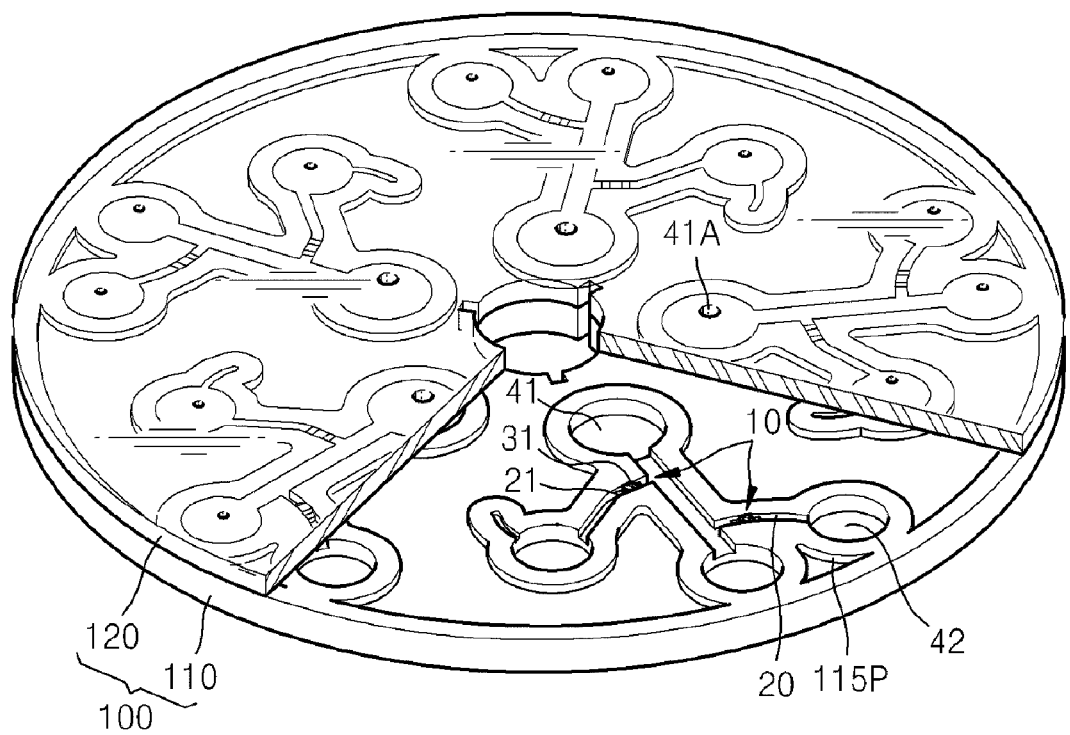
FIG. 9 is a perspective view of a microfluidic device according to an exemplary embodiment of the present invention.

FIG. 9 is a perspective view of a microfluidic device according to an exemplary embodiment of the present invention. In the present exemplary embodiment, a microfluidic structure includes a platform 100 having a disc shape, and a plurality of microfluidic valves 10, channels 20, and chambers 41 and 42 included in the platform 100. The platform 100 can be rotated, and a fluid can be moved in the microfluidic structure due to the centrifugal force generated by the rotation of the platform 100.

The platform 100 includes an upper substrate 120 and a lower substrate 110 combined to each other. The lower substrate 110 includes three-dimensional structures that provide the chambers 41 and 42 and valve gap forming units 21 and protruding patterns 115P protruding along the outer walls of the microfluidic structure. The protruding pattern 115P can be formed in a band shape. However, it is unnecessary for the protruding pattern 115P to have a uniform width or a band shape.

Of the chambers 41 and 42, the chambers 41 close to the center of the platform 100 is referred to as sample chambers 41, and sample injection holes 41A connected to the sample chambers 41 can be formed in the upper substrate 120.

In the manufacturing of a microfluidic device, an upper substrate 120 and a lower substrate 110 as described above are prepared, a valve material 31 is distributed in the valve gap forming unit 21 on the lower substrate 110, and a reaction solution is injected into the reaction chamber 42. In order to combine the upper substrate 120 and the lower substrate 110, as described with reference to FIG. 8, an adhesive pattern corresponding to the protruding pattern 115P on the lower substrate 110 is formed on the lower surface of the upper substrate 120. Afterwards, the two substrates 120 and 110 are overlapped and pressed against each other. When required energy for combining the two substrates 120 and 110 is applied thereto, manufacture of the platform 100 described above can be completed. Thus, a microfluidic device can be manufactured through melting and solidifying the valve material 31 by radiating electromagnetic wave energy to the microfluidic valve 10.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A microfluidic valve including:
    a platform that comprises upper and lower substrates combined facing each other;
    a channel, having a first depth, formed between the upper and lower substrates, the channel being provided to allow flow of a fluid from a first end to a second end of the channel;
    a valve gap that is disposed in at least a first region of the channel and has a second depth which is smaller than the first depth; and
    a valve plug that is disposed in the first region to fill the valve gap so as to block the flow of the fluid from the first end to the second end of the channel through the valve gap,
    wherein the valve plug is formed of a valve material including a phase change material and a plurality of exothermic particles,
    wherein the phase change material is solid at room temperature, and the plurality of exothermic particles emit an amount of heat sufficient to melt the phase change material by absorbing energy so as to allow the flow of the fluid from the first end to the second end of the channel through the valve gap.

2. The microfluidic valve of claim 1, wherein the channel is formed on an upper surface of the lower substrate, and
    wherein the upper and lower substrates are combined to each other by combining a portion of the lower substrate that comprises at least outer walls of the channel, and a corresponding portion of the upper substrate.

3. The microfluidic valve of claim 1, wherein at least one of the upper and lower substrates comprises a protruding pattern formed along outer walls of the channel and a surface of the protruding pattern is combined with a surface of the upper or lower substrate that faces the protruding pattern.

4. The microfluidic valve of claim 1, wherein the phase change material is one selected from the group including wax, gel, and thermoplastic resin.

5. The microfluidic valve of claim 1, wherein the exothermic particles comprise metal oxide particles.

6. The microfluidic valve of claim 5, wherein the metal oxide particles include at least one selected from the group including $Al_2O_3$, $TiO_2$, $Ta_2O_3$, $Fe_2O_3$, $Fe_3O_4$, and $HfO_2$.

7. The microfluidic valve of claim 1, wherein the exothermic particles comprise at least one of polymer particles, quantum dots, and magnetic beads.

8. The microfluidic valve of claim 1, wherein the energy comprises an electromagnetic wave radiated from an outside of the microfluidic valve.

9. A microfluidic valve including:
    a platform that comprises upper and lower substrates combined facing each other;
    a channel, having a first depth, formed between the upper and lower substrates, the channel being provided to allow flow of a fluid from a first end to a second end of the channel;
    a valve gap that is disposed in at least a first region of the channel and has a second depth which is smaller than the first depth so that the fluid can flow in the channel through the valve gap; and
    a valve material chamber that is disposed close to the channel, connected to the valve gap, and contains a valve material,
    wherein the valve material comprises a phase change material, that is solid at room temperature, and a plurality of exothermic particles that emit an amount of heat sufficient to melt the phase change material by absorbing energy so as to allow the valve material melted by the energy to flow into the valve gap.

10. The microfluidic valve of claim 9, wherein the channel is formed on an upper surface of the lower substrate, and
    wherein the upper and lower substrates are combined to each other by combining a portion of the lower substrate that comprises at least outer walls of the channel and the valve material chamber.

11. The microfluidic valve of claim 9, wherein at least one of the upper and lower substrates comprises a protruding pattern formed along the outer walls of the channel and the valve material chamber, and a surface of the protruding pattern is combined with a surface of the upper or lower substrate that faces the protruding pattern.

12. A method of manufacturing a microfluidic valve including:
(a) providing an upper substrate and a lower substrate;
(b) forming a channel having a first depth between the upper and lower substrates which face each other, and forming a valve gap having a second depth formed in at least a portion of the channel region, wherein the second depth is smaller than the first depth so that a fluid can flow through the valve gap in the channel;
(c) distributing a melted valve material in a region of the lower substrate corresponding to the valve gap and solidifying the valve material;
(d) forming a platform by combining the upper substrate and the lower substrate; and
(e) forming a valve plug by filling the valve gap with the valve material in a melted state by applying heat to the valve material and then allowing the valve material to re-solidify in the valve gap so that the fluid cannot flow through the valve gap,
wherein the valve material comprises a phase change material, which is a solid state at room temperature, and a plurality of exothermic particles that emit an amount of heat sufficient to melt the phase change material by absorbing energy.

13. The method of claim 12, wherein operation (b) comprises forming the channel and the valve gap on an upper surface of the lower substrate, and configuring the upper substrate to cover at least a region that comprises the channel.

14. The method of claim 13, wherein operation of (a) comprises providing a protruding pattern formed along outer walls of the channel,
wherein operation (d) is performed by combining the lower substrate and the upper substrate coating an adhesive on a surface of the protruding pattern of the lower substrate.

15. The method of claim 13, wherein operation (a) comprises providing a protruding pattern formed along outer walls of the channel, and
wherein operation (c) is performed by combining the lower substrate and the upper substrate after coating an adhesive on the upper substrate in a shape corresponding to a shape of the protruding pattern.

16. The method of claim 15, wherein the coating is performed using an inkjet printing method.

17. The method of claim 12, wherein in operation (e), the applying heat is performed by radiating electromagnetic waves onto a region that comprises the valve material and the valve gap.

18. The method of claim 12, wherein in operation (e) the applying heat is performed by heating a region that comprises the valve material and the valve gap in contact with a heat source.

19. A method of manufacturing a microfluidic valve including:
(a) providing an upper substrate and a lower substrate;
(b) forming between the upper and lower substrate:
a channel having a first depth;
a valve gap having a second depth formed in at least a portion of the channel between the upper and lower substrates which face each other, wherein the second depth is smaller than the first depth so that a fluid can flow through the valve gap in the channel; and
a valve material chamber is connected to the valve gap;
(b) distributing a melted valve material in the valve material chamber and solidifying the valve material; and
(c) forming a platform by combining the upper substrate and the lower substrate,
wherein the valve material comprises a phase change material, which is a solid state at room temperature, and a plurality of exothermic particles that emit an amount of heat sufficient to melt the phase change material by absorbing energy.

20. The method of claim 19 further including:
(d) radiating energy to the valve material in the valve material chamber until a portion of the valve material vaporizes, and allowing the valve material melted by the energy to flow into the valve gap by vapor pressure of the vaporized valve material so that the fluid cannot flow through the valve gap in the channel.

21. A microfluidic device including:
a platform that comprises upper and lower substrates combined facing each other; and
a microfluidic structure that is disposed in the platform and comprises at least a chamber, a channel, and a first microfluidic valve for manipulating a fluid,
wherein the microfluidic valve comprises:
a channel, having a first depth, formed between the upper and lower substrates, the channel being provided to allow flow of the fluid from a first end to a second end of the channel;
a valve gap that is disposed in at least a region of the channel and has a second depth which is smaller than the first depth; and
a valve plug that is disposed to fill the valve gap so as to block the flow of the fluid from the first end to the second end of the channel through the valve gap,
wherein the valve plug is formed of a valve material including a phase change material and a plurality of exothermic particles,
wherein the phase change material is solid at room temperature, and the plurality of exothermic particles emit an amount of heat sufficient to melt the phase change material by absorbing energy so as to allow the flow of the fluid from the first end to the second end of the channel through the valve gap.

22. The microfluidic device of claim 21, wherein the microfluidic structure is formed on an upper surface of the lower substrate, and
wherein the upper and lower substrates are combined to each other by combining a portion of the lower substrate that comprise at least outer walls of the microfluidic structure, and a corresponding portion of the upper substrate.

23. The microfluidic device of claim 21, wherein at least one of the upper and lower substrates comprises a protruding pattern formed along outer walls of the microfluidic structure, and a surface of the protruding pattern is combined with a surface of the upper or lower substrate that faces the protruding pattern.

24. A microfluidic device including:
a platform that comprises upper and lower substrates combined facing each other; and
a microfluidic structure that is disposed in the platform and comprises at least a chamber, a channel, and a first microfluidic valve for manipulating a fluid,
wherein the microfluidic valve comprises
a channel, having a first depth, formed between the upper and lower substrates, the channel being provided to allow flow of the fluid from a first end to a second end of the channel;
a valve gap that is disposed in at least a region of the channel and has a second depth which is smaller than the first depth so that the fluid can flow in the channel through the valve gap; and a valve material chamber that is disposed close to the channel, connected to the valve gap, and contains a valve material, wherein the valve material comprises a phase change material, that is solid at room temperature, and a plurality of exothermic particles that emit an amount of heat sufficient to melt the phase change material by absorbing energy so as to allow the valve material melted by the energy to flow into the valve gap.

25. The microfluidic device of claim 21, wherein the platform has a rotatable disc shape and the fluid in the microfluidic structure is moved by a centrifugal force generated by rotation of the platform.

* * * * *